May 12, 1970 W. K. DOW 3,511,365
DISPOSABLE SUN SHADES FOR VEHICLE WINDOWS
Filed Dec. 3, 1968

INVENTOR.
Walter K. Dow
BY Chapin, Neal & Dempsey
ATTORNEY

United States Patent Office 3,511,365
Patented May 12, 1970

3,511,365
DISPOSABLE SUN SHADES FOR VEHICLE
WINDOWS
Walter K. Dow, Longmeadow, Mass.
Filed Dec. 3, 1968, Ser. No. 780,632
Int. Cl. B65d 85/67
U.S. Cl. 206—56         2 Claims

ABSTRACT OF THE DISCLOSURE

A roll of disposable sun shades of pliable sheet material for use on automobile side windows, the individual shades being defined by longitudinally spaced transverse tear lines and having opposing marginal edges on one face thereof provided with strips of pressurre sensitive bonding material to removably mount the same against the glass of a car window and eliminate objectionable rays of sun.

BACKGROUND

Figure 1:
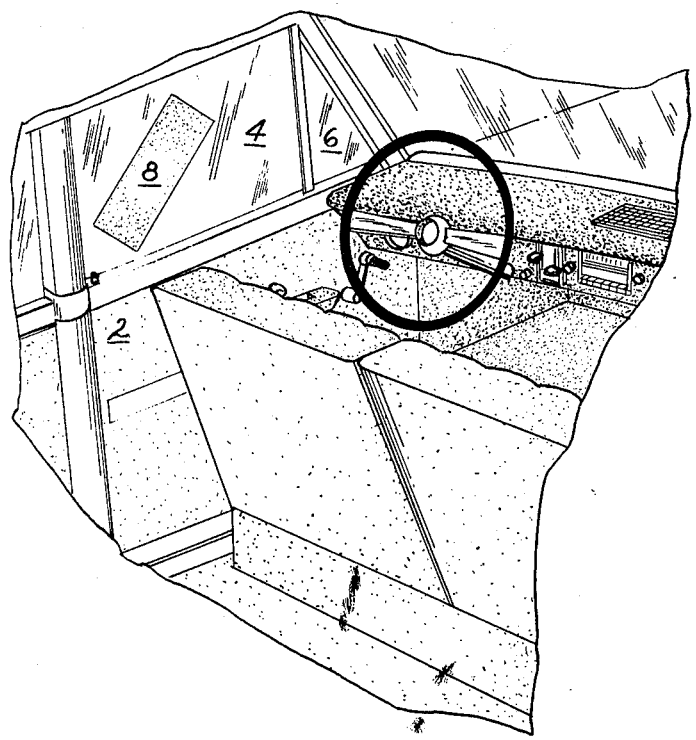

This invention relates to a simple and positive sun shade made of pliable sheet material of an opaque or heavily tinted transparent or translucent character and in particular to a packet formed as a roll of individually separable shades for easy application to automobile windows for temporary use in order to block out objectionable rays of the sun, especially through the side windows of a car.

In present day automobiles one of the optional features available is that of tinted windshields and windows which are designed to provide eye comfort for the driver and front seat passengers and to provide for added efficiency of an air conditioner in cars equipped with such units. Such optional equipment is relatively expensive and in the lower portions of the windows particularly will not effectively block out objectionable rays of the sun.

As an alternative or supplement to tinted car window glass, various accessories familiar to the motoring public are also available, such as venetian blinds, tinted plastic shades for fastening to windows as by vacuum cups or otherwise, or other cumbersome pull down shades of various types. The very bulkiness and awkwardness of application and storage of such units has, however, largely eliminated them as simple accessories of a practical nature for the car owner.

Insofar as I am aware at the present time no inexpensive, simple, and practical means is available for the ready and temporary protection of a driver and particularly the car passengers from the direct rays of the sun entering the side windows while a car is being driven for some while in a direction having a relatively disadvantageous angular relationship to the sun.

SUMMARY

The present invention in its preferred form contemplates a roll of suitably dimensioned disposable sun shades or patches for application to the windows of present day cars, the roll being made up of an opaque pliable sheet material or other pliable paper or plastic material of character to eliminate or deflect objectionable rays of the sun. Perforated, slit, or scored transverse tear lines are provided at equally spaced intervals on the roll to define the individual shades and to enable each to be readily torn from the free end in applying the same in a desired position on the window surface. Opposite marginal edges of the shades are provided for a removable attachment with an narrow strip or band of pressure sensitive adhesive bonding material. Preferably the bands extend along the outer marginal edges of the roll. Each individual shade can thus be rolled against the window surface and in doing so progressively be applied in the positional location desired. Thereafter the roll may be separated from the sun shade so applied and be handled with a minimum of manipulation.

Among the objects of this invention are the following: to provide a simple, inexpensive and practical sun-proof shade or patch quickly applicable to any portion of a car window where the incoming rays of the sun may be objectionable and offensive to the driver or the passengers; to provide a quickly and easily removable sun-proof shade which may be readily disposed of when its purpose has been accomplished, as by crumpling and placing it in the litter bag of a vehicle; to provide a convenient readily accessible packet of shades which may be stored in the glove compartment of the average car for ready availabilty; to provide a sun shade for application in any location against the window and at the most advantageous angular relation to block the sun's rays entering a vehicle interior to a passenger's discomfort; and to provide a shade which may be positioned only where necessary and without unduly blocking the driver or passenger's vision through other portions of the window.

Figure 2:
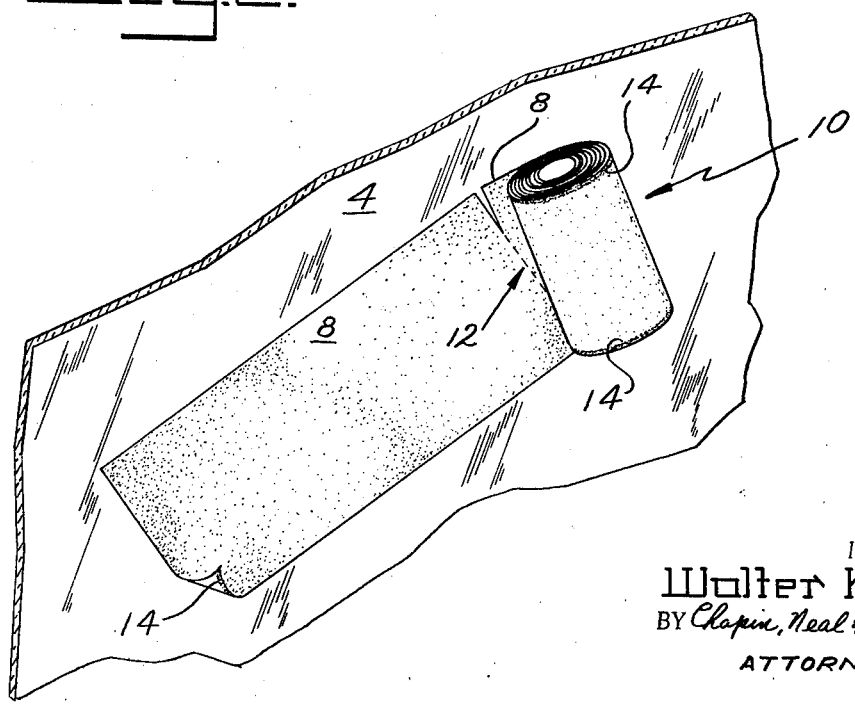

These and other objects and advantages of the invention will be apparent from the following description of an embodiment thereof as shown by the accompanying drawings, in which:

FIG. 1 is a fragmentary perspective view from the rear of the front seat of a car and illustrating a sun shade of the present invention as applied to the inside of a side window and in a position as chosen by the driver to block the sun's ray; and FIG. 2 is a fragmentary view of a window glass showing a roll of the disposable shades positioned immediately after affixing a shade to the inside surface of the glass.

DESCRIPTION

Referring to the drawings, FIG. 1 shows a door 2 on the driver's side with the usual window at 4 and a conventional ventilator window panel at 6. An individual sun shade 8 of the present invention forms a patch of desirable and convenient size which is applied to the inside glass surface so as to block objectionable rays of the sun from striking the driver's body when shining through the glass from the angle indicated. The shade 8 may be a of paper or plastic sheet material of a relatively limp or pliable nature and is either opaque or of a densely tinted transparent or translucent character which is effective to block out sun rays or to eliminate any heat transmission thereof through the shade. It will be readily apparent that a shade as the shade 8 may be positioned at any desired location on the window with respect to the driver nd correspondingly that it may be affixed to any other side window of a car so as to shield any portion of a passenger's body or face from the sun. In the event a single shade is insufficient as a fully effective shield, a second shield may be applied either in an overlapping relation or otherwise as desirable.

The individual shades 8 as previously stated are separated as needed from a roll of convenient size. Such a roll is shown at 10 in FIG. 2. The roll is provided with perforated, scored, or slit transverse tear lines as at 12 at equally spaced intervals longitudinally of the roll.

The particular nature of the perforations may be determined as most suitable for the particular character of the material. Perforations are suitable for paper stock, slits or heavy scoring for sheet plastic composition materials. The width dimension of the roll is preferably on the order of 6 or 7 inches and the length of the individual shades is approximately 14 to 16 inches. The size of the shades may, of course, be varied, the particular dimensions mentioned having been found suitable for the windows of most present day model cars, the width especially being of a convenient dimension to fit in most car glove compartments for easy storage and ready availability.

At the marginal longitudinal edges of the shades as on the outer face of the rolled sheet are shown the bands or strips 14 of pressure sensitive adhesive bonding material. In providing the strips 14 on the surface facing outwardly of the roll the shade at the free end thereof may be applied to the window glass as by pressing the end edges on the window and then rolling the roll 10 against the window surface as from the left to right. Thus in the single operation of unwinding the shade in this fashion from the roll it is progressively applied in place on the window. There is no manipulating of a single sheet and fumbling to smooth it into place. As indicated by FIG. 2 the roll may then be angularly moved relative to the applied shade and separated therefrom along the transverse tear line.

In FIG. 2 the lower left hand corner edge of the shade 8 is turned up to indicate the strip 14 of pressure sensitive bonding material and further to indicate that the shade may be removed by simply lifting a corner and stripping it off the glass. As will be readily understood, the pressure sensitive adhesive bonding material used may be of any suitable type to result in temporary adherence to the glass surface as long as may be desirable and for the easy removal of the shade without leaving any "tacky" residue. Such adhesive materials are well-known in the art. Furthermore, coating materials are likewise well known in the art for treating opposing sheet material surfaces against which such an adhesive strip may be laid. Thus the strips may be peeled away from the rolls without leaving a tacky residue on the surface of the underlying material. Such pressure sensitive adhesive bonding materials and coating prepartions for opposing surfaces are exemplified in numerous tapes or rolled labels, one such example being the familiar so-called masking tape sold under the Scotch Brand trademark of the Minnesota Mining and Manufacturding Co. Thus the edges on the outer side of the shades 8 are treated with a suitable backing or coating material to prevent adherence of the pressure sensitive material to these surfaces when the shades are unrolled and in similar fashion removal of the shade from a window glass surface will leave no residue of a tacky substance on the glass.

It is to be noted that since the pliable sheet material of the roll of shades 8 is paper thin and thus a roll packet 10 may provide a plurality of sun shades for convenient storage, the character of the disposable sun shade, particularly with the longitudinal edges thereof adhering to the window glass, also results in a flat hugging planar disposition against the glass surface so that unlike previous known sun shades affixed to the inside window surface, the window itself may, if necessary, be lowered into the door well and raised again without disturbing the positional relation of the shade on the window.

The application of the sun shades disclosed has been described in connection with its particular utility for passenger cars. It will be realized, however, that a roll, as the roll 10, may be usefully employed by a passenger in a bus, airplane or train where it may be desirable to block out the sun's rays against his body without entirely blocking out all vision through the window.

While the invention has been described in connection with the specific embodiment as shown in the drawings, it will be apparent that minor changes in structure and operation can be made without departing from the spirit of the invention.

What is claimed is:

1. A packet of disposable sun-proof shades in roll form for automobile side windows comprising a roll of pliable sheet material having longitudinally spaced transverse tear lines defining a series of separable sun shades, the individual shades of said roll being provided on one face thereof and along a pair of opposite marginal edges with a strip of cleanly detachable pressure sensitive adhesive material for affixing end edge portions of a shade at the free end of the roll against the surface of a car window, unrolling said end shade onto said window surface and tearing off and pressing the same into a temporarily desired flat portion of attachment and ready removal thereof when said shade is no longer required.

2. The packet structure of claim 1 in which said sheet material is opaque and said strips of pressure sensitive adhesive material extend longitudinally along the marginal edges of said roll of sheet material.

References Cited

UNITED STATES PATENTS

| | | | |
|---|---|---|---|
| 1,256,818 | 2/1918 | Nile | 206—62 |
| 2,529,060 | 11/1950 | Trillich. | |
| 3,025,098 | 3/1962 | Andrews | 296—97 |
| 3,282,623 | 11/1966 | Paro | 296—97 |
| 3,411,562 | 11/1968 | Garrett | 296—95 |

WILLIAM T. DIXSON, Jr., Primary Exminer

U.S. Cl. X.R.

206—58; 296—97